Dec. 14, 1965   F. A. MONAHAN   3,222,914
IMPACT APPARATUS
Filed Sept. 11, 1961   6 Sheets-Sheet 1

INVENTOR.
FREDERICK A. MONAHAN
BY Thomas P. Mahoney
ATTORNEY

Dec. 14, 1965  F. A. MONAHAN  3,222,914
IMPACT APPARATUS
Filed Sept. 11, 1961  6 Sheets-Sheet 3

INVENTOR.
FREDERICK A. MONAHAN
BY
Thomas P. Mahoney
ATTORNEY

INVENTOR.
FREDERICK A. MONAHAN
BY
Thomas P. Mahoney
ATTORNEY

3,222,914
IMPACT APPARATUS
Frederick A. Monahan, La Mesa, Calif., assignor, by mesne assignments, to International Electronic Corporation, Burbank, Calif., a corporation of California
Filed Sept. 11, 1961, Ser. No. 137,409
16 Claims. (Cl. 72—453)

The present invention relates to impact apparatus, and more particularly to apparatus for utilizing a fluid medium under pressure to exert controlled impact forces upon a material or workpiece.

Impact formation of materials is a comparatively recent development for forming and shaping certain of the newer, high strength materials which cannot be formed in a practicable manner by any other process. Of the impact devices currently available for impact forming of materials, one of the most efficient is based upon the "counterblow" principle, in which a pair of hammers are rapidly brought toward each other to bring dies supported thereon into forcible engagement at very high velocities. The kinetic energy of the hammers is transferred to the workpiece during movement of the hammers so that, depending upon the relative masses of the hammers, very little of the impact forces is transferred to the hammer support structure. However, such "counterblow" devices have certain shortcomings which limit their usefulness and complicate their operation.

More particularly, the "counterblow" devices of the prior art are substantially all characterized by high initial impact, followed by a very rapid drop-off of follow-up or squeeze pressures, and high initial impact forces frequently shatter the workpiece or break the dies. Depending upon the nature of the material of the workpiece, the shape of the workpiece, and the forming operation involved, a variety of impact-squeeze relationships might be desirable, but prior are devices are not adapted to provide an adjustment of impact-squeeze relationship to suit the momentary need. That is, either the kinetic energy of the hammers is all absorbed by the workpiece in one impact, or this energy is all transferred to the workpieces in a relatively slow squeeze.

Further, the valving arrangements of prior art impact devices commonly employ small area valves which require comparatively long strokes to produce orifice cross sections adequate to pass sufficient pressurized fluid for rapidly driving the impact hammers together. During initial hammer travel the pressure fluid thus flows through a relatively small orifice which gradually increases as the valve opens and the hammer stroke continues. That is, such valving arrangements have the inherent limitation of being incapable of initially and substantially instantaneously passing a sufficient volume of fluid under pressure to achieve high final impact velocities for large hammer masses. Desirably, such impact devices should have a large orifice for passage of pressurized fluid after only a short opening movement of the valve or valves, and prior to any appreciable movement of the hammers has occurred.

Therefore, it is an object of the present invention to provide an impact apparatus which is adjustable to provide a variety of impact-squeeze relationships for various forming operations and for various materials.

Another object of the invention is to provide an impact apparatus which includes an annular valve which is arranged about the periphery of the hammer sections to permit achievement of a very large annular orifice area after minimum valve movement, providing maximum pressures substantially instantaneously. The present impact forming apparatus also, in one embodiment, incorporates the pressure reservoir in one of the hammers so that long connecting conduits and similar fluid pressure limiting devices are eliminated, the fluid pressure being available immediately adjacent the hammers for actuation thereof. This integration of the fluid pressure reservoir in one of the hammers also provides a means for adjusting the mass of that hammer, as by dividing the reservoir into two compartments, one for liquid mass and one for pressurized fluid. Also, the liquid mass could be pressurized to provide the pressurized working fluid, and the gaseous material of the other compartment pressurized to provide a pressure accumulator arrangement.

Another object of the invention is to provide an impact apparatus which employs a pair of hammers movable toward each other at very high velocities under the impetus of fluid under pressure, and wherein one or both of the hammers may be multiple hammers. That is, the hammer includes a plurality of hammer sections, and each pair of these sections defines a pressurizable chamber which enables adjustment of the impact-squeeze work diagram upon the workpiece between the hammers. More particularly, engagement of the main hammers is divided into an "impact" blow, that is, a blow of relatively short duration, and a "squeeze" blow of longer duration, according to the magnitude of the pressure within the pressurizable chambers intermediate each pair of the hammer sections of the hammer. Thus, in an embodiment employing an upper hammer opposed by a lower hammer constituted by a pair of hammer sections, the initial impact on the workpiece is provided by the upper section of the lower hammer striking the upper hammer. The subsequent follow-up or squeeze pressure is provided by the mass of the lower hammer section of the lower hammer. The mass of the lower hammer section is effective to provide a steady build-up or squeeze pressure if the pressure in the intermediate chamber is fairly high, or provide a second impact blow closely following the initial impact blow if the intermediate chamber pressure is low.

Another object of the invention is the provision of an impact apparatus which eliminates work spoilage by controlling the rebound or separation of dies subsequent to an impact blow. Any rebound or "re-hit" occurs between sections of the hammer or hammers rather than between the hammers themselves.

A further object of the invention is to provide an impact apparatus whose operation may be adjusted to vary the floor loadings on buildings within which the apparatus is used.

Another object of the invention is to provide an impact apparatus which is capable of withstanding considerably more eccentric loading than similar apparatus of the prior art. That is accomplished by providing large diameter hammer areas which provide a broader, more stable base for the apparatus. However, the pressure areas are not correspondingly as large because they are made annular in form, thereby avoiding the need for impractically large quantities of pressure fluid.

Another object of the invention is the provision of an impact machine which incorporates damping means for reducing rebound or rehit oscillations between the impact elements or hammers.

Another object of the invention is to provide an impact apparatus in which the mutually opposed impact elements or hammers are arranged in coaxial, telescoping relationship to provide an apparatus of small, compact size for a given capacity, and characterized by predetermined, constant alignment of components.

A further object of the invention is to provide an impact apparatus in which the hammers cannot be actuated for an impact stroke except by deliberate operation of a plurality of separate valves. The valves are characterized by a "fail-safe" design such that any malfunction of the valves prevents operation of the impact apparatus.

Another object of the invention is to provide an impact apparatus which is adapted to form and shape workpieces in a controlled atmosphere devoid of workpiece contaminants. A door seals the workpiece forming area, and also functions as a safety door to protect operators from flying material, such as might occur when the impact apparatus is used for hobbing operations.

A further object of the invention is to provide an impact apparatus in which the various components thereof are quickly and easily assembled and disassembled, many of the components being fitted together by quick-operating "breech-block" connections. For this reason, the present impact apparatus is relatively inexpensive to manufacture and maintain. The dies thereof are also quickly fitted into position by "breech-block" connections, providing positive die alignment and easy installation and removal.

A further object of the invention is to provide an impact forming apparatus which is adapted to be operated in a vertical position, or tilted and operated in a horizontal position if desired.

It is another object of the present invention to provide an impact forming apparatus of compact form, of minimum weight for a given capacity or energy capability, and which is adapted to be actuated by a variety of pressurized fluids for driving together multiple hammers for forging, extruding, impact extruding, compacting, forming, hobbing, and other operations.

Other objects and features of the present invention will become apparent to those skilled in the art from the following specification and accompanying drawings wherein is illustrated various forms of the invention, and in which.

Referring now to the drawings, and particularly to FIGS. 1 through 13, there is illustrated an impact forming apparatus 10, according to the present invention, which constitutes a high velocity, impact apparatus capable of hammer accelerations in excess of 1,000 feet per second per second as compared to presses of the prior art, whose range is generally less than 100 feet per second per second. The particular rates of acceleration may be modified as desired, according to the particular task to be performed, and these figures are therefore intended only to be indicative of the relative capability of the apparatus. As will be seen, the apparatus 10 is useful in a variety of operations such as forging, extruding, compacting, forming, hobbing, impact extrusion, and others.

Figure 1:
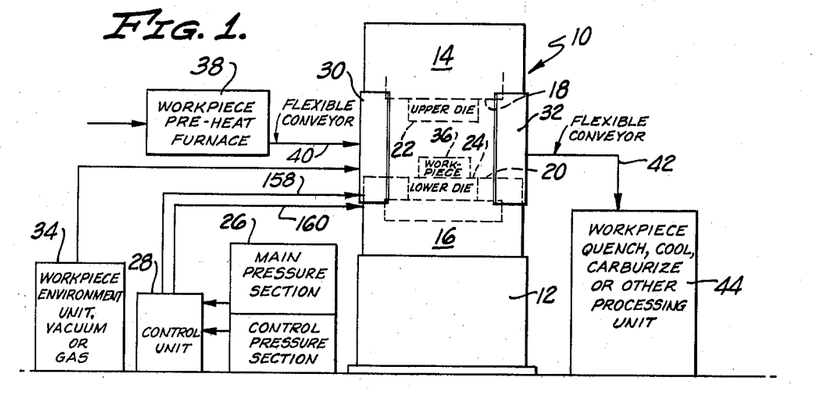
FIG. 1 is a diagrammatic view of the present impact apparatus illustrating the general association thereof with external equipment for introducing workpieces, controlling operating fluid pressures, providing an artificial atmosphere where needed, removing workpieces, and processing the formed workpieces.
Figure 2:
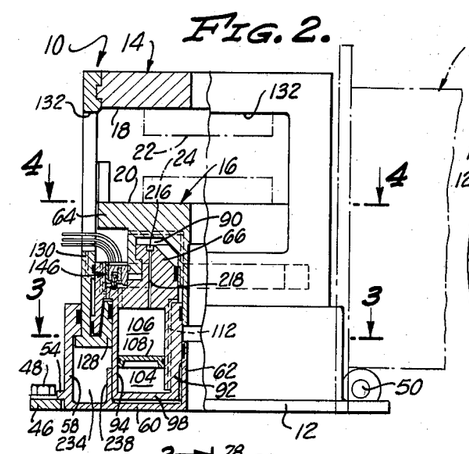
FIG. 2 is a simplified schematic view, in vertical cross section, illustrating one embodiment of the present impact apparatus.
Figure 3:
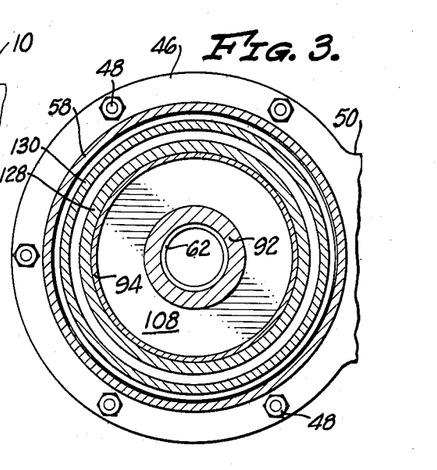
FIG. 3 is a view taken along the line 3—3 of FIG. 2.

The apparatus 10 comprises, FIG. 1, a support base or frame 12 which supports a pair of impact elements or hammers 14 and 16 for vertical slidable movement relative to each other, the hammers 14 and 16 including, respectively, opposed die platens 18 and 20 for supporting an upper die 22 and a lower die 24. As will be described in greater detail hereinafter, the die platens 18 and 20 are urged toward each other at high velocity by the introduction of fluid under pressure from an internal pressure reservoir of the apparatus 10. The pressure reservoir is provided with fluid under pressure by an external pressure fluid supply unit 26, including a main pressure section and a control pressure section, which is controlled by a control unit 28. The unit 28 also controls the release of pressure fluid from the internal reservoir to initiate a work stroke, and the exhaustion of spent pressure fluid upon the completion of a work stroke. To accomplish this, various control lines or conduits extend from the interior of the impact machine to the exterior control unit 28, as will be seen.

The units 26 and 28 are merely exemplary, and will not be described in detail inasmuch as other control arrangements may also be used if desired, it being noted mainly that the routing of pressure fluid for operating the apparatus 10 is preferably controlled from a single operating station such as the unit 28. In addition, the working pressure fluid is preferably compressed air, but other forms of fluid, such as compressed gas or vapor or incompressible hydraulic liquids may be used if desired.

The control unit 28 is operative to control the output of the compressor unit 26 and the routing of pressurized fluid, in accordance with the desires of the operator or in accordance with automatic input data. For example, the control unit 28 is operative to block the output of unit 26 and effect exhaustion of spent pressure fluid from the apparatus 10 upon completion of an impact stroke by means of, for example, electrical contact between portions (not shown) of the apparatus 10 which move relative to each other during an impact stroke, thereby providing an electrical signal to the unit 28. Likewise, as is well known to those skilled in the servo art, the output of unit 26 may be routed into the internal reservoir, and the fluid in the internal reservoir released to initiate an impact stroke by similar operation of the externally located unit 28.

The hammers 14 and 16 are preferably cylindrical in configuration, portions of the walls thereof being cut away to provide openings for the insertion and removal of workpieces. These openings are slidably covered by a pair of doors 30 and 32 so that during operation of the apparatus 10 the volume between the spaced hammers 14 and 16 can be evacuated or supplied with an artifical atmosphere, as by a workpiece environment unit 34. The unit 34 is illustrated to show diagrammatically how such a unit can be easily associated with the present apparatus 10 to provide an artificial and protective atmosphere for the material to be worked upon by the apparatus 10. Thus, for example, a workpiece 36 may be first preheated in a furnace 38, then carried by a flexible conveyor 40 between the dies 22 and 24, conveyed from between the dies 22 and 24 by a flexible conveyor 42 upon completion of the forming operation, and thereafter treated in a processing unit 44, as by quenching, cooling, carburizing, or the like. Thus, the apparatus 10 is adapted to successively form or shape a continuous flow of workpieces 36, provide a protective atmosphere, and permit rapid insertion and removal of workpieces for production runs.

Figure 5:
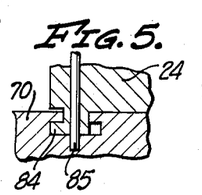
FIG. 5 is an enlarged, cross-sectional view of one form of interlocking arrangement between one of the forming dies and its supporting impact element or hammer.
Figure 6:
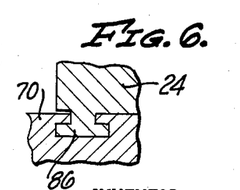
FIG. 6 is an enlarged, cross-sectional view of another form of interlocking arrangement between one of the forming dies and its supporting hammer.
Figure 7:
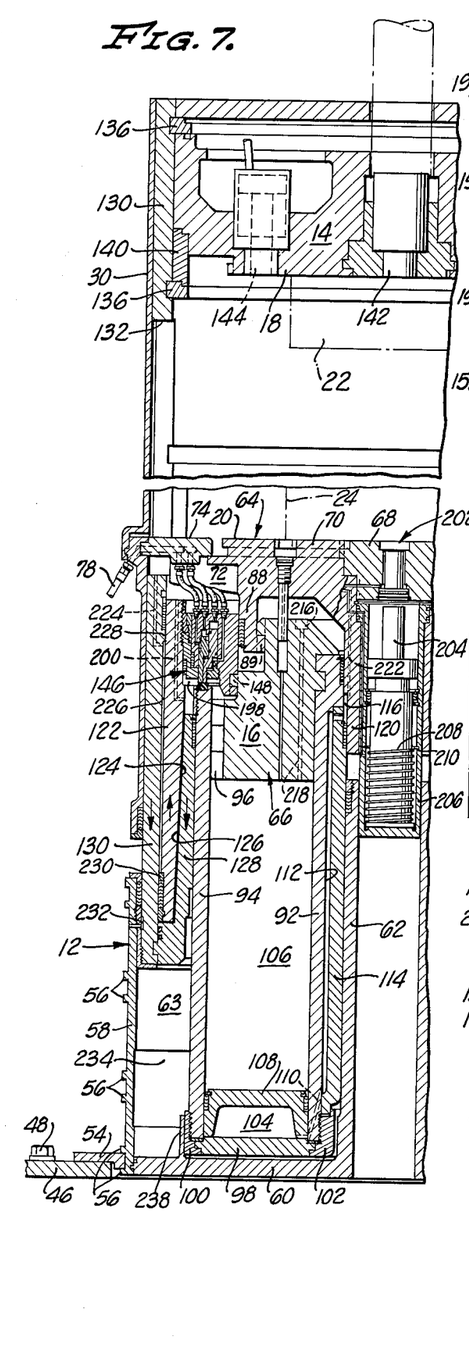
FIG. 7 is a partial, vertical cross-sectional view of the embodiment of FIG. 2.

Referring now to FIGS. 2 through 6 for a simplified showing of the inter-relationship of the various components of the apparatus 10, and to FIG. 7 for a detailed showing of the construction thereof, the frame 12 is cylindrical in configuration, and includes a circular base flange 46 fixed to the floor by a plurality of bolts 48. The frame 12 also includes an annular collar 54 which rests against the flange 46 at one side, and is hinged at 50 on the other side to the flange 46 to permit the flange 46 and apparatus 10 to which the flange 46 is secured to be quickly pivoted from a vertical position to a horizontal position (shown in phantom outline in FIG. 2) when desired to perform certain impact forming operations horizontally. The operation of the apparatus 10 is unaffected by its position relative to the floor because the hammers 14 and 16 almost completely derive their impetus from pressurized fluids rather than the action of gravity.

The annular collar 54 is secured to the frame 12 by any suitable locking means (not shown), fitting within the lower pair of a plurality of vertically spaced pairs of circular shoulders 56 projecting outwardly from a cylindrical base wall 58 which constitutes the lower portion of the frame 12. It will be apparent that the vertical height of the frame 12 can be altered by changing the location of the collar 54 from one pair of flanges 56 to another pair.

The lower extremity of the frame 12 is substantially closed by an end wall 60 of circular configuration which is secured to the lower end of the base wall 58. The center portion of the end wall 60 extends upwardly to form an upwardly projecting center cylinder 62, and the walls of the cylinder 62 and the base wall 58 define between them a hollow, annular section 63 within which the hammers 14 and 16 are vertically slidable.

The lower hammer 16 is a multiple hammer, being constituted by a pair of hammer sections 64 and 66 which coact to provide additional work upon the workpiece 36 after the initial impact between the single hammer 14 and hammer 16. The hammer sections 64 and 66 are preferably circular, for interfitting telescopically to provide predetermined, constant alignment.

The upper section 64 includes the flat portion constituting the lower platen 20 which, in turn, is made up of a circular inner platen portion 68 which is removably secured within an annular outer platen portion 70, the purpose of such removability becoming apparent later. The separable arrangement therebetween is by a "breech-block" connection, which, as is well known, is formed between relatively rotatable parts for locking the parts together. Alternate projections and slots on one part mate with similar projections and slots on the other part. The projections of one part are stepped and the projections of the other part are oppositely stepped so that upon partial rotation of one part, the steps thereof slide over the steps of the other part. Thereafter, the parts cannot be separated without first rotating them relative to each other. This form of rotatable connection is used extensively to secure together various components of the present impact forming apparatus because so many of the components are circular or cylindrical in configuration.

Figure 4:
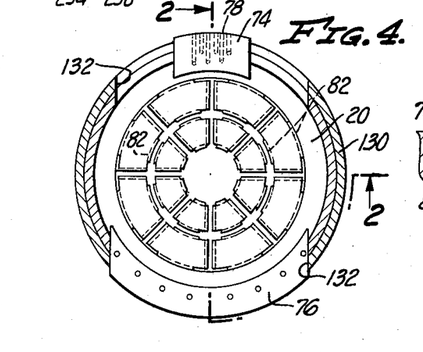
FIG. 4 is a view taken along the line 4—4 of FIG. 2, it being noted that FIG. 2 is taken along the line 2—2 of FIG. 4.

The outer platen portion 70 support certain valving and other structure and for this purpose includes radially extending ribs 72 to which are secured a manifold 74 and a support shelf 76, FIG. 4. Various fluid pressure lines from the pressure fluid supply unit 26, one such line being illustrated at 78 in FIG. 7, are connected to the manifold 74. These pressure lines also pass through the upper portion of a cylindrical shield 80 which depends from the outer edge of the manifold 74 and the shelf 76, and serves to prevent the escape of any artificial atmosphere or vacuum established between the hammer platens 18 and 20, as will be described more particularly subsequently.

The platen portions 68 and 70, together with the manifold 74 and the shelf 76, form a continuous working surface for handling workpieces and supporting the die 24, it being noted that each of these components is secured together, as a unit which moves with the multiple hammer 16.

Each of the platen portions 68 and 70 is provided with circular, concentric cut-outs or grooves 82 for mating with projections provided on the dies 22 and 24. These projections may take the form of circularly arranged, L-shaped legs 84, as illustrated in FIG. 5, or T-shaped legs 86, as illustrated in FIG. 6. The dies 22 and 24 are immediately self-centering because of the mutual interfitting of the circular grooves 82 and legs 84 or 86 and only a slight rotation is needed to key the legs 84 or 86 within the grooves 82, in the manner of the breech-block connection previously described. A suitable anti-rotation locating pin 85, FIG. 5, may be disposed through adjacent portions of the dies 22 or 24, as the case may be, and its associated platen portion to prevent inadvertent relative rotation therebetween. This self-centering, breech-block connection of the dies 22 and 24 to the hammers 14 and 16 thus eliminates cumbersome bolts or clamps and the possibility of die misalignment or breakage due to inaccurate location.

The upper section 64 is connected to the lower section 66 of the hammer 16 by a breech-block connection between a depending cylindrical wall 88, integral with the upper section 64, and the outer periphery of the upper extremity of the lower section 66, as at 89. It is noted that the breech-block mating portions of the two sections 64 and 66 are made wide to overlap and provide large through-passages or ports for the passage of fluid under pressure. These ports form a portion of the path for pressurized fluid from the internal reservoir, and empty into a squeeze chamber 90 formed between the underside of the upper section 64 and the upper side of the lower section 66. The squeeze chamber 90 has an important function in producing a predetermined impact-squeeze work function against the workpiece, as will be seen.

The annularly configured lower section 66 is also secured by breech-block connections to the upper extremities of an inner cylinder 92 and an outer cylinder 94, the cylinders 92 and 94 being spaced apart to provide an annular interior chamber or reservoir 106. The reservoir 106 is the main supply of pressurized fluid and is connected to the main valve assembly 146 by ports 96 which extend about the perimeter of the hammer section 66. The port areas 96 are formed in the breech-block connection with the cylinder 94, approximately 50 percent of the material of the perimeter being removed to provide very large port areas for the almost instantaneous passage of large quantities of pressurized fluid, as will subsequently be described in greater detail.

The cylinders 92 and 94 are closed at their lower extremities, thereby sealing the lower end of the reservoir 106, by an annular base plate 98 secured in position by a pair of threaded rings 100 and 102. An accumulator chamber 104 is defined within the reservoir 106 by a free-floating piston 108, which is slidably disposed within the reservoir 106, and is connected to the exterior control unit 28 by an elongated, annular chamber 112 formed between the cylinder 92 and a cylinder 114 which is vertically slidable upon the center cylinder 62. The conduits from the control unit 28 are not shown, but they extend into a chamber 116, in communication with the chamber 112, the chamber 116 being formed between the upper extremity of the cylindrical member 114 and a depending cylindrical center section 120 which is integral with the upper hammer section 64. It is noted that both the cylindrical member 114 and the cylinder 92 are coaxially slidable upon the center section 120 of the upper hammer section 64 so that the hammer sections 64 and 66 are always aligned in predetermined relationship with respect to each other.

The outer cylinder 94 carries a downwardly extending tension member 122 which is one of the two members forming the pressure faces which are acted upon to drive the hammers 14 and 16 toward each other. The member 122 is cylindrical and includes a downwardly and outwardly inclined pressure face 124 which is spaced a relatively small but uniform distance from a similar pressure face 126 of an upwardly extending, cylindrical tension member 128. This tension member 128 is connected to the upper hammer 14 by a cylindrical tension member 130, the lower extremities of the tension members 128 and 130 being connected together by a breech-block connection while the upper portions thereof are spaced apart to slidably receive the tension member 122 of the opposite hammer 16.

Entry and exit portions 132 are cut in the upper portion of the tension member 130 to permit workpieces to be placed between and removed from the dies 22 and 24.

The portions or openings 132 are normally covered by the arcuate doors 30 and 32 which are vertically slidable upon the member 130, the doors 30 and 32 being upwardly slidable to permit workpieces to be inserted for work thereupon. In the closed position of the doors, the interior of the apparatus 10 is sealed for imposing a vacuum or providing an artificial atmosphere about the workpieces.

As already mentioned, the tension members 128 and 130 form a portion of the upper hammer 14, and the upper extremity of the tension member 130 is provided with vertically spaced grooves for accepting a pair of rings 136 which support the upper platen 18 in position to carry the upper die 22. A cylindrical spacer 140 is normally disposed between the lower portion of the platen 18 and the lower ring 136 to provide a predetermined distance between the upper and lower platens 18 and 20, the spacer 140 being removable for substitution of a larger or smaller spacer to adjust the opening or "daylight" between the platens 18 and 20 when desired.

The apparatus 10 is also adapted to extrude materials although the extrusion opening in the platen 18 is illustrated as closed by a plug 142. This plug 142 is removable to receive an extruding die, or, should the extruding die be located in the lower platen 20, to receive the extruded workpiece. This general arrangement is illustrated, for example, in FIGS. 21–24. In addition, a plurality of air actuated, conventional hold-down devices 144 may be incorporated in the upper platen 18 for holding down the workpiece, particularly where the workpiece is sheet metal covering an extensive working area.

Figure 8:
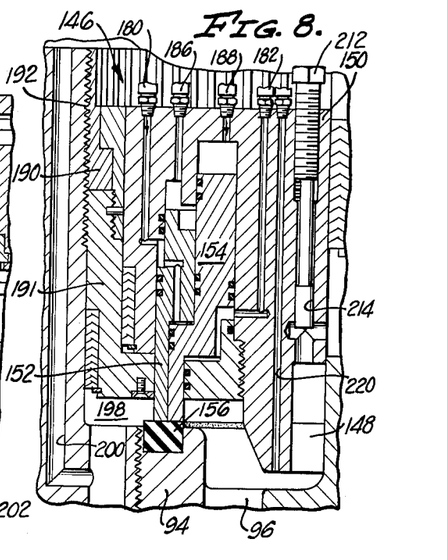
FIG. 8 is an enlarged, vertical cross-sectional view of the main valve assembly of the impact forming apparatus of FIG. 7.

As illustrated in FIG. 8, an annular main valve assembly 146 is secured to and movable with the lower section 66 of the lower hammer 16, being vertically slidable relative to the upper section 64 of the hammer 16. The main valve assembly 146 includes an annular valve body 150 which is secured by a breech block connection to the lower hammer section 66, the breech block connection including elongated cutout portions providing a plurality of elongated ports 148, FIG. 7, connecting the ports 96 and the ports 89 which lead to the squeeze chamber 90. Within the valve body 150 are reciprocably mounted a pair of valves 152 and 154 which normally extend downwardly and seat against an annular sealing ring 156, secured within a groove provided therefor in the reservoir outer cylinder 94. The valves 152 and 154 are operable to permit fluid under pressure to flow from the reservoir chamber 106 through the ports 96 to the opposed pressure faces 124 and 126 for driving the hammers 14 and 16 together.

Figure 9:
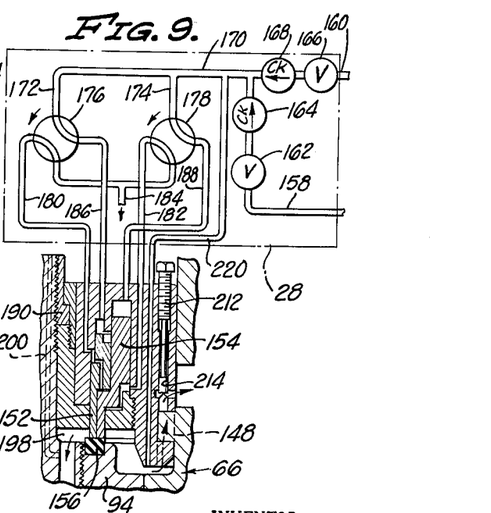
FIG. 9 is a view similar to FIG. 8, on a reduced scale, illustrating the main valve assembly in association with an external system for controlling the introduction, exhaust, and distribution of fluid under pressure.
Figure 10:
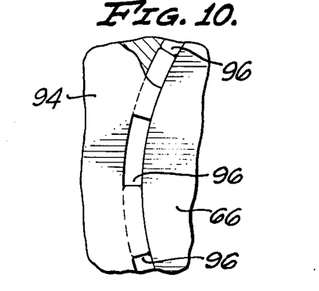
FIG. 10 is an enlarged view of a portion of the lower impact element or hammer, illustrating the elongated pressure ports connecting the pressure reservoir and the opposed pressure faces of the hammers.
Figure 11:
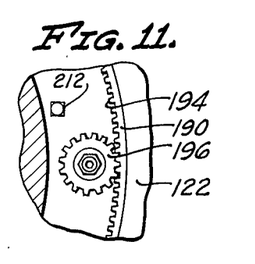
FIG. 11 is an enlarged plan view of apparatus for actuating the regulating valve for adjusting the size of the orifices connecting the pressure reservoir and the opposed pressure faces of the hammers.
Figure 12:
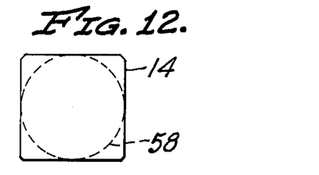
FIG. 12 is a schematic plan view of the general outline of the impact apparatus of FIG. 2, but illustrating how the upper portion thereof may be made square in configuration.
Figure 13:
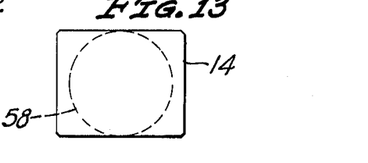
FIG. 13 is a schematic plan view of the general outline of an impact forming apparatus like that of FIG. 2, but wherein the configuration of the upper portion thereof is rectangular.

Referring now to FIGS 1, 8, and 9, a pair of conduits 158 and 160 carry fluid under pressure from the pressure supply unit 26 to the control unit 28, the conduit 158 being a comparatively large line for supplying an appreciable volume of pressurized fluid for the operation of the present apparatus 10. The conduit 160 is a smaller line for providing lesser amounts of pressurized fluid to adjustably move portions of the apparatus 10 for preliminary setting up a job, for example as will become apparent.

The conduit 158 includes a shut-off valve 162 and a check valve 164, and the conduit 160 includes a similar shut-off valve 166 and a similar check valve 168. Both conduits 158 and 160 lead into a common conduit 170 which then branches into conduits 172 and 174 passing to a pair of operating valves 176 and 178, respectively. As will be apparent from an examination of FIG. 9, the valves 176 and 178, in the positions there illustrated, pass fluid under pressure to the upper sides of both of the valves 152 and 154, tending to keep them seated against the sealing ring 156 when the shut-off valves 162 and 166 are open. This is the normal position of the valves 176 and 178.

Any pressure against the undersides of the valves 152 and 154 which would tend to raise or unseat these valves is vented through a pair of conduits 180 and 182 leading to the valves 176 and 178, and passing therefrom into a common conduit 184 for discharge to atmosphere.

The shut-off valves 162 and 166 are normally open, and the operating valves 176 and 178 are operated either manually or automatically at the control unit 28 to initiate a cycle of operation of the apparatus 10. Assuming the valves 176 and 178 have been operated by rotating them 90 degrees from the positions illustrated, fluid under pressure will pass through the conduits 172 and 174 to the conduits 180 and 182, respectively, which lead to the undersides of the valves 152 and 154. This pressure at the undersides of the valves 152 and 154 raises them off the sealing ring 156 and permits fluid under pressure to flow from the internal reservoir 106 to the pressure faces 124 and 126 for initiating movement of the hammers 14 and 16. At this time pressure from the upper sides of the valves is being exhausted through a pair of conduits 186 and 188 to the common conduit 184.

It is noted that, with this arrangement, a separate and independent actuation of each of the valves 152 and 154 is necessary to permit the flow of pressure fluid to the pressure faces 124 and 126. In addition, as a safety feature, the areas of the upper sides of the vales 152 and 154 are greater than the area of their undersides so that equal pressure on both sides of the valves tends to keep the valves seated.

The volume of flow of pressurized fluid past the valves 152 and 154 is regulated by the vertical position of an annular regulating valve 191 of the valve body 150. More particularly, the body 150 includes an annular ring 190 which is threaded at 192 to the tension member 122 of the lower hammer 16, the annular ring 190 including a plurality of gear teeth 194 which mesh with the teeth of a pinion gear 196, FIG. 11. Although the annular ring 190 is thus threadably carried by the tension member 122, the regulating valve 191 is vertically slidable relative to the tension member 122 so that rotation of the annular ring 190 raises and lowers the regulating valve 191 to thereby vary or adjust the orifice size of the passage 198 adjacent the lower extremities of the valves 152 and 154.

The pinion gear 196 includes a socket for receiving a movable crank (not shown) so that rotation of the crank by the operator of the present apparatus 10 is effective to adjust the size of the orifice 198 as desired. The regulating valve 191 may be lowered completely when it is desired to shut off the flow of pressurized fluid from the reservoir 106, and in this position of the valve 191, the pressure faces 124 and 126 may be "inched" apart or slowly separated by applying a lesser volume of fluid through a passageway 200 provided in the upper extremity of the tension member 122, the passageway 200 being suitably connected to the control unit 28 by means not shown.

The regulating valve 191 is thus operative to adjust the rapidity of closure of the hammers 14 and 16 by adjustment of the volume of fluid passing from the reservoir 106 to the pressure faces 124 and 126 of the hammers 14 and 16.

The inner platen portion 68 is removable from the lower hammer 16 to enable a knock-out assembly 202 to remove workpieces which may have become jammed between hammers 14 and 16 during the forming thereof. The detailed construction of the assembly 202 is not important to the present invention, but it generally comprises a piston 204 slidable within a cylinder 206 and operated by pressure lines brought into the cylinder 206. Fluid pressure drives the piston 204 upwardly upon completion of a forming operation, and a compression spring 208 is arranged to interengage between the piston 204 and a retainer ring 210 carried by the cylinder 206, to return the piston 204 to its original position after the actuating pressure is cut off.

Referring now to FIGS. 2, 14, 15, and 16, the overall operation of the apparatus 10 will next be described. First, the control unit 28 is operated to actuate the pair of valves 152 and 154 of the main valve assembly 146. This allows an extremely large quantity of fluid under pressure to flow from the internal pressure reservoir 106, through the orifice 198, and between the pressure faces 124 and 126. The pressure build-up between the faces 124 and 126 pulls the hammer 14 downwardly and the resulting reaction force pushes the lower hammer 16 upwardly.

Figure 14:
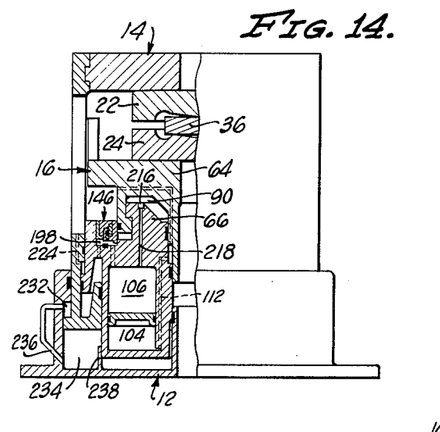
FIG. 14 is a schematic, elevational view of the embodiment of FIG. 2, with the hammers just contacting the workpiece, and subsequent to opening of the main valves.

The effect of gravity is comparatively insignificant relative to the level of applied pressure energy, so that the lower hammer section 66 raises and rapidly approaches the downwardly moving upper hammer 14. Initial contact between the dies 22 and 24 is illustrated in FIG. 14, and the counterblow action exerts tremendous work on the workpiece 36, all of the kinetic energy of the upper hammer section 64 being delivered to the work in impact form.

The kinetic energy of the lower hammer section 66, which is following closely behind the upper hammer section 64, is next delivered to the work as follow-up or squeeze pressure, the magnitude and duration of this squeeze pressure being dependent upon the pressure existing in the squeeze chamber 90. As the mass of the lower hammer section 66 continues to drive against the upper hammer section 64, the pressure in the squeeze chamber 90 increases, and an increasing squeeze pressure is imposed upon the workpiece until, ultimately, the lower hammer section 66 completes its movement toward the upper hammer section 64 and contacts it to provide a second impact blow.

From the above, it is seen that there will first occur an initial impact, then a squeeze or build-up interval, and finally a second impact, all during a very short period of time. These work application phases are variable in duration and intensity by reason of the provision of a multiple lower hammer 16 whose sections are separated by the squeeze chamber 90. That is, the pressure in the squeeze chamber 90 produces the particular character or relationship of impact-squeeze best suited to the formation of the part or workpiece involved.

In this regard, it is noted that the pressure level in the squeeze chamber 90 can even be adjusted to a level different from that existing in the pressure reservoir 106 through the operation of a plurality of bypass valves 212, one of which is illustrated in FIGS. 8 and 9. The bypass valves 212 are threaded into the valve body 150 of the main valve assembly 146, and each includes a headed upper extremity adapted to be turned by a wrench or the like to adjustably locate the lower extremity of the valve 212 within a metering passage 214. The passage 214 is formed in the valve body 150 and is located between the ports 148 and the ports 89 which form a portion of the fluid path to the squeeze chamber 90.

Rotation of the bypass valves 212 to lower them is effective to reduce the amount of pressure fluid which can escape from the squeeze chamber 90 subsequent to initial impact between the upper hammer 14 and the upper section 64 of the lower hammer 16. By thus restricting the escape passage of fluid in the squeeze chamber 90, it will be apparent that the pressure in the chamber 90 tends, upon initial impact, to increase above that which exists in the reservoir 106.

Stated another way, the ease with which the pressure in the squeeze chamber 90 is released to the reservoir 106 determines the level of squeeze pressure applied to the workpiece 36 by the lower hammer section 66 subsequent to initial impact. In this regard, the lower hammer section 66 includes a plurality of relief valves 216 located in relief passages 218 which extend between the internal reservoir 106 and the squeeze chamber 90. The relief valves 216 permit an unrestricted flow of pressure fluid from the reservoir 106 into the squeeze chamber 90, but block all flow in the opposite direction so that the flow of fluid back to the reservoir 106 is completely controlled by the bypass valves 212.

The relief valves 216, by controlling the direction of flow of fluid with respect to the squeeze chamber 90, greatly reduce oscillation and rehits of the dies 22 and 24. Any rebound which may develop occurs between the sections 64 and 66 of the lower hammer 16 rather than between the dies 22 and 24. Die breakage is thus reduced by eliminating repetitive impacts between the dies. The sequence of action of the hammer sections 64 and 66 to prevent such rehits between the dies is as follows: first, the initial impact of the upper hammer 14 and the upper section 64 of the lower hammer 16 causes the upper section 64 to move toward the lower section 66, compressing the fluid in the squeeze chamber 90; next, the closing or downward movement of the upper section 64, which would tend to separate the dies 22 and 24, is retarded by compression of the fluid in the squeeze chamber 90. This not only tends to keep the sections 64 and 66 from separating, and hence keeps the dies 22 and 24 from separating, but also imposes a build-up in pressure, or "squeeze," upon the workpiece. Movement of the sections 64 and 66 away from each other, which would tend to bring the dies 22 and 24 together, is unrestricted. Thus, the lighter mass of the section 64, as compared to the masses of the section 66 and of the hammer 14, is always employed to maintain the dies 22 and 24 in engagement. For comparative purposes, the masses of the section 66 and the hammer 14 are approximately equal, but the mass of the section 64 is about one-third of the mass of either of these.

The effective pressure area of the squeeze chamber 90, which tends to move the sections 66 and 64 apart, is preferably made large compared to the effective pressure area of the pressure faces 124 and 126 so that maximum squeeze forces are achieved through the utilization of relatively lower pressures. This concept is prevalent throughout the present apparatus 10, it being noted that very high impact and squeeze forces are achieved by the apparatus 10, while employing relatively low squeeze pressures compared to similar apparatus of the prior art, by reason of the provision of very large effective pressure areas.

The make-up pressure fluid from the fluid supply unit 26 is carried to the internal reservoir 106 through a suitable conduit (not shown) which is connected to a passageway 220, FIG. 8, provided in the main valve assembly 146. The passageway 220 opens into the fluid path between the squeeze chamber 90 and the internal reservoir 106, and, as will be apparent, the fluid supply unit 26 is operated to continuously provide pressure fluid to the internal reservoir 106 until a predetermined pressure level is established. In this regard, the embodiment of FIGS. 1 through 16 is adapted to employ either air or liquid as a pressure fluid. In the event that a liquid is used, the internal reservoir 106 is charged with the liquid, and air under pressure is fed from the exterior of the apparatus 10 through a suitable conduit (not shown) to a passageway 222, FIG. 7, provided in the section 64 of the lower hammer 16. The passageway 222 communicates with the chamber 116 and the chamber 112, and then passes through the fluid passage 110 to the accumulator chamber 104.

The hammers 14 and 16 are permitted to move away from each other by exhausting the fluid under pressure from between the pressure faces 124 and 126, through an exhaust passage 224, FIGS. 7 and 14 through 16, which is, in turn, connected to the fluid supply unit 26 for recompression and subsequent re-use in the internal reservoir 106.

With the valves 152 and 154 in their closed positions, closing off the flow of pressure fluid from the internal reservoir 106 to the pressure faces 124 and 126, the hammers 14 and 16 may be "inched" or slowly moved away from each other by exhausting air from the return chamber 226, FIG. 7, which air was compressed within the chamber 226 during the impact stroke of the hammers 14 and 16. The chamber 226 is formed between a shoulder 228 of the outer tension member 130 and a retainer ring 230 carried by the tension member 122.

In addition to providing a means for slowly inching the hammers 14 and 16 toward or away from each other, the chamber 226 also acts as a buffer or damping means for reducing oscillation which may occur between the large mass of the upper hammer 14 and the large mass of the lower section 66 of the lower hammer 16. Although shown in the embodiment of FIGS. 25 through 28, and not shown in the embodiment now being described, a conduit may be connected between the return chamber 226 and the internal reservoir 106 so as to prevent the buildup of a very high pressure in the return chamber upon impact between the hammers. It is theorized that a high pressure in the return chamber 226 may induce undesirable oscillation, and therefore the pressure therein would be vented to the internal reservoir 106 whenever the pressure in the return chamber 226 exceeded that existing in the internal reservoir 106.

An air cushion or stop is provided between the upper hammer 14 and the base or frame 12 by a damping chamber 232, FIG. 7 and FIGS. 14 through 16, provided between the base 12 and the upper hammer 14. The damping chamber 232 acts as a cushion to limit the upward movement of the upper hammer 14 with respect to the base 12, it being noted that movement of the upper hammer 14, as well as the movement of the lower hammer 16 downwardly, is cushioned by a low pressure chamber 234 defined by the undersides of the upper hammer 14, the lower section 66 of the lower hammer 16, and the end wall 60 of the base 12. That is, the low pressure chamber 234 is charged with low pressure air and, in conjunction with the chamber 232, damps oscillations of the upper hammer 14 with respect to the base 12, these chambers preferably being connected by a conduit 236 to equalize the pressures in the two chambers.

Figure 15:
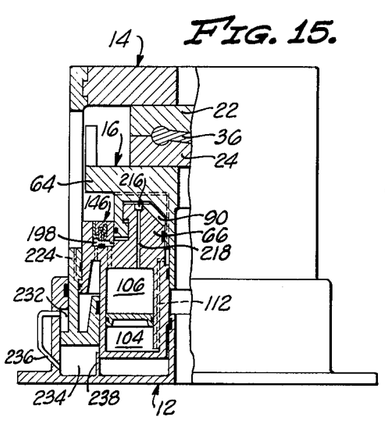
FIG. 15 is a schematic, elevational view of the apparatus of FIG. 14, with the workpiece fully formed, both impact and squeeze portions of the work cycle having been completed.
Figure 16:
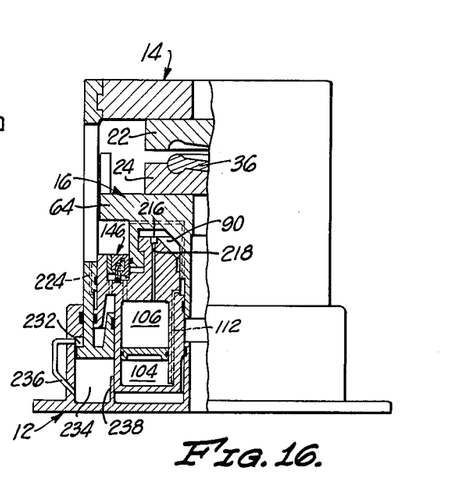
FIG. 16 is a schematic, elevational view of the apparatus of FIG. 14, with the hammers moving away from each other subsequent to the forming of the workpiece.
Figure 17:
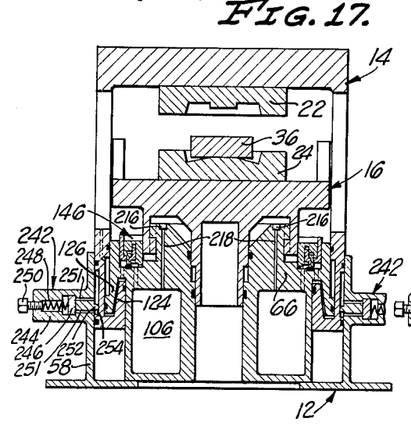
FIG. 17 is a schematic, elevational view of a second embodiment of an impact forming apparatus according to the present invention, prior to opening of the main valves thereof, with the hammers fully separated.
Figure 18:
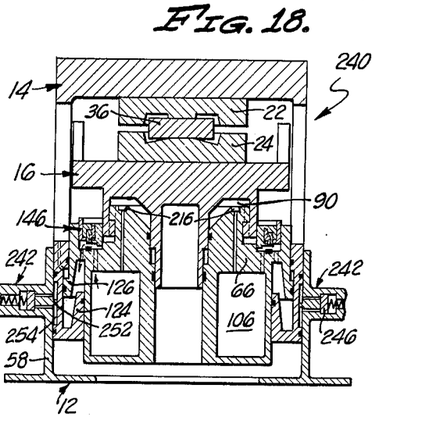
FIG. 18 is a schematic, elevational view of the apparatus of FIG. 17, subsequent to opening of the main valves, with the upper hammer just engaging the workpiece.
Figure 19:
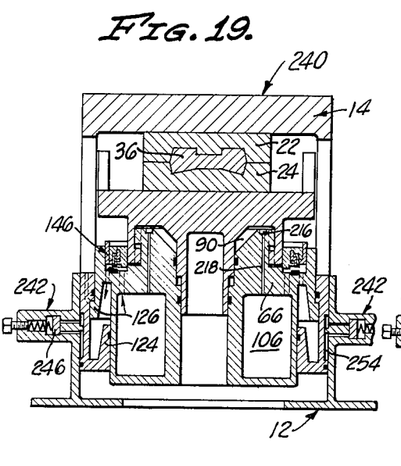
FIG. 19 is a schematic, elevational view of the apparatus of FIG. 17, subsequent to opening of the main valves, with the workpiece fully formed between the hammers.
Figure 20:
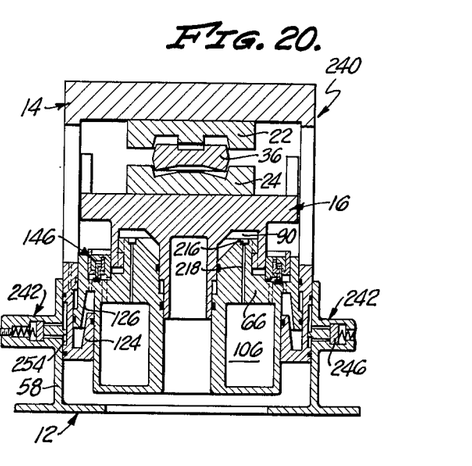
FIG. 20 is a schematic, elevational view of the apparatus of FIG. 17, with the main valves closed and the hammers moving away from each other.

The pressure in the low pressure chamber 234 also serves to maintain the upper and lower hammers 14 and 16 in the raised positions illustrated in FIGS. 14 through 16.

An annular ring or wall 238 is incorporated in the end wall 60 to provide a dashpot effect for gradually decelerating the movement of the lower hammer 16 toward the base 12.

Referring now to FIGS. 17 through 20, there is illustrated an impact-squeeze apparatus 240 which is generally similar to the apparatus just described, and where the components are substantially similar in shape and function to those of the embodiments of FIGS. 1 through 16, similar reference numerals will be applied for simplicity, it being understood that identical reference numerals do not designate exactly identical components where the description indicates otherwise. The primary features which characterize the apparatus 240, as compared to apparatus 10, are the absence of a low pressure air chamber, such as the chamber 234 of the apparatus 10. Instead of air supporting the hammers 14 and 16, the hammers are gradually lowered to the floor, that is, toward the base 12, by a plurality of bypass assemblies 242 arranged about the periphery of the base 12. In addition, the apparatus 240 does not include an accumulator chamber 104.

More particularly, the apparatus 240 includes the upper hammers 14 and 16 which are driven together to form a workpiece 36 between a pair of dies 22 and 24. The hammers 14 and 16 are driven toward each other by the sudden passage of fluid under pressure from the internal reservoir 106, past the main valve assembly 146, and between the pressure faces 124 and 126 of the upper and lower hammers 14 and 16, respectively.

As with the apparatus 10, the squeeze chamber 90 affords a squeeze or follow-up pressure after the initial impact between the hammers 14 and 16.

Each bypass assembly 242 is constituted by a cylindrical body 244 integral with the base wall 58 of the base 12. Within the hollow interior of each cylindrical body 244 is horizontally and slidably mounted a piston 246 which is outwardly biased by a compression spring 248 whose spring rate is adjustable by rotation of a threaded element 250. The piston 246 is movable inwardly to block a pair of bypass ports 251 communicating with an annular chamber 254 defined between adjacent surfaces of the base wall 58 and the outer tension member 130 of the upper hammer 14. The pistons 246 are normally biased against the ports 251, blocking flow therethrough of the hydraulic liquid with which the chamber 254 is charged, and flow can then only occur through a predetermined clearance between the tension member 130 and an annular shoulder 252 of the base 12. This dashpot arrangement reduces oscillation of the upper hammer 14 with respect to the base 12, although the existence of the various bypass assemblies 242 does not prevent the sudden closing movement of the hammer 14 upon an impact forming operation. That is, the sudden pressures then developed against the pistons 246 through the ports 251 urge the pistons 246 inwardly against the bias of the springs 248, allowing free hammer travel.

The damping liquid in the chamber 254 need not be replenished except for normal leakage, providing an efficient, relatively trouble-free liquid damping arrangement for reducing oscillatory movements of the upper hammer 14.

Referring now to FIGS. 21 through 24, yet another embodiment, designated generally by the numeral 256, is illustrated, identical numerals being used to designate components of the apparatus 256 which are substantially similar to the components of the apparatus 10 previously described.

The apparatus 256 is constituted by the upper hammer 14 and the lower hammer 16, which are driven toward each other to extrude a workpiece 36, and which utilize extruding dies 258 and 260 for this purpose. The operation of the apparatus 256 is generally similar to that of the apparatus 10, but the internal reservoir thereof is not integral with the lower hammer section 66, as was previously the case with the apparatus 10, but instead is defined between a vertically oriented, annular wall 262 of the base 12 and an inwardly located, annular wall 264 of the base 12. The reservoir 266 thus formed is charged with compressed air through an annular passage 268 defined between the cylindrical lower extremity of the lower hammer section 66 and an inwardly extending upper wall 270 which forms a part of the annular wall 262.

Figure 21:
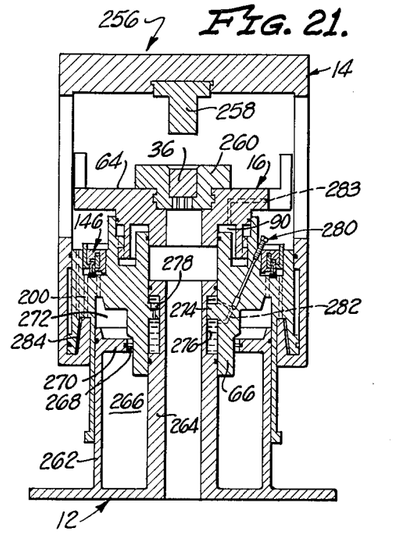
FIG. 21 is a schematic, elevational view of a third embodiment of the present invention, with the hammers in inoperative position, prior to opening of the main valves.
Figure 23:
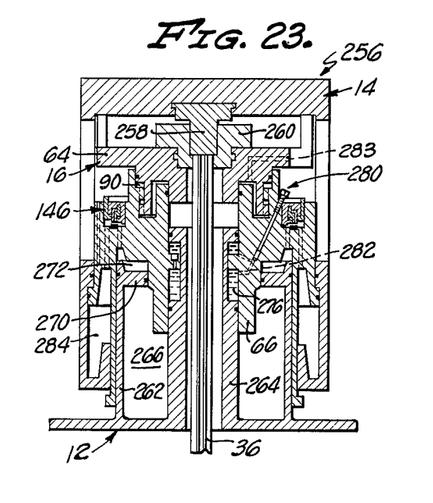
FIG. 23 is a schematic, elevational view of the apparatus of FIG. 21, the main valves being open with the dies together and the workpiece being extruded.

As will be apparent from a comparison of FIGS. 21 and 23, the annular passage 268 is closed off upon downward movement of the lower hammer section 66 by reason of slidable engagement between an enlarged diameter portion of the lower hammer section 66 and the interior edge of the upper wall 270. When such slidable engagement occurs, the air in a cavity or supplemental squeeze chamber 272 defined between the lower hammer section 66 and the upper surface of the wall 270 of the base 12 will be compressed, the purpose of this compression being described in greater detail hereinafter.

Movement of the hammer section 66 relative to the base 12 is damped by a dashpot arrangement constituted by an inwardly directed, annular shoulder 274, which is integral with the hammer section 66 and vertically slidable within an annular chamber 276 formed by a reduction in diameter of the wall 264 of the base 12. A plurality of check valves 278 are incorporated in the annular shoulder 274 about the periphery thereof to permit unrestricted flow from the underside to the upperside of the shoulder 274 of damping liquid contained in the chamber 276. The flow of such liquid readily permits the hammer section 66 to be moved freely downwardly upon impact between the hammers 14 and 16, but upward movement of the hammer section 66 is gradual and adjustable by operation of a plurality of bypass valves 280 which vary the amount of damping liquid permitted to flow past the annular shoulder 274 through a bypass passage 282.

The primary squeeze chamber 90 defined between the hammer sections 64 and 66 is independent or closed in the apparatus 256, and may be charged to any desired pressure, and particularly pressures in excess of the pressure within the internal reservoir 266 to provide high levels of squeeze forces where necessary. The squeeze chamber 90 also has an effect in reducing oscillations of the hammer section 64 since the action of compressing the air in the chamber 90 itself constitutes a form of damping action. However, such oscillation is primarily liquid damped by the arrangement of the check valves 278 and the bypass valves 280.

The apparatus 256 is operated to produce an extruded workpiece 36 as follows: the primary squeeze chamber 90 is charged through a passageway 283 to the desired pressure for achieving the necessary follow-up or squeeze pressures subsequent to impact. Next, the main valve assembly 146 is operated, as previously described in conjunction with the apparatus 10, to raise its valves 152 and 154 to permit a rapid flow of large volumes of pressurized fluid from the internal reservoir 266, through the annular passage 268, through the supplemental squeeze chamber 272, past the main valve assembly 146, and into the pressure chamber 284 defined by the pressure faces of the upper hammer 14 and the section 66 of the lower hammer 16. It is noted that the normal pressure existing in the internal reservoir 266 is sufficient to support the hammers 14 and 16 in the raised positions illustrated in FIG. 21.

Figure 22:
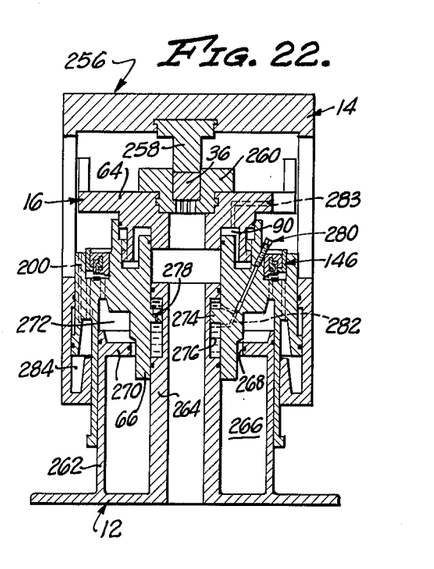
FIG. 22 is a schematic, elevational view of the apparatus of FIG. 21, the main valves being open with the dies just engaging.

The introduction of pressure fluid into the chamber 284 then urges the hammers 14 and 16 together, and contact occurs between the dies 258 and 260, as best viewed in FIG. 22. At this point, initial impact occurs, the upper hammer 14 is slowed in its downward movement, and a downward movement of the lower hammer 16 next occurs. Since the upper section 64 of the lower hammer 16 is at this time in engagement with the upper hammer 14, the downward movement of the upper section 64 compresses the fluid in the primary squeeze chamber 90 and imposes a follow-up or squeeze pressure upon the workpiece 36.

Next, upon compression of the fluid in the primary squeeze chamber 90, the downward movement of the upper hammer 14 continues until it reaches the position illustrated in FIG. 23. At this point, the annular passage 268 is closed, and the fluid in the supplemental squeeze chamber 272 is then compressed to provide a pressure increase in the pressure chamber 284. This increase in pressure acts to supplement the forces already urging the hammers 14 and 16 together, and thus provides supplemental squeeze forces upon the workpiece 36 over and above the squeeze force derived from the action of the squeeze chamber 90 alone.

Figure 24:
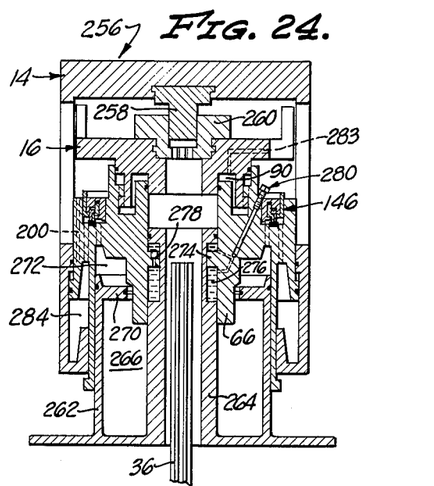
FIG. 24 is a schematic, elevational view of the apparatus of FIG. 21, the main valves being closed, with the dies moving away from each other.
Figure 25:
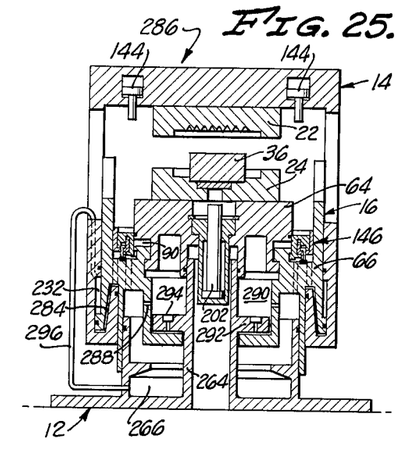
FIG. 25 is a schematic, elevational view of a fourth embodiment of the present invention, the hammers thereof being illustrated in their position prior to initiation of the forming operation.
Figure 26:
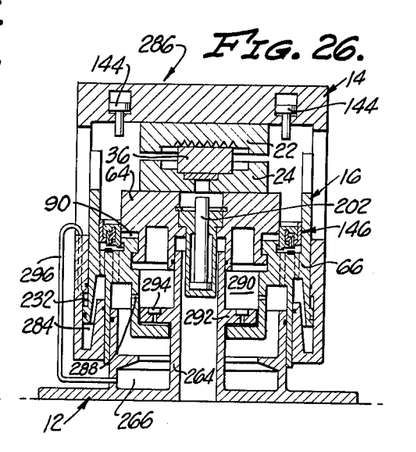
FIG. 26 is a schematic, elevational view of the apparatus of FIG. 25, illustrating the upper die just engaging the work subsequent to the opening of the main valves.

It will be apparent that a great deal of force acting against the workpiece 36 is transferred to the floor or supporting structure in the embodiments of FIGS. 21 and 24. This occurs because a portion of the internal reservoir 266 is defined by the base 12, and the reaction forces occurring during the impact and squeeze sequences first described are transmitted to the base 12 as reaction forces.

The completion of the extruding operation is illustrated in FIG. 24, the main valve assembly 146 having just been operated to close the valves 152 and 154. The pressure in the chamber 284 is next vented or exhausted through the passageway 200 to permit the hammers 14 and 16 to resume the positions illustrated in FIG. 20, ready for another cycle of operation.

Referring now to FIGS. 25 through 28, another embodiment of the present invention is illustrated, being designated generally by the numeral 286.

The primary feature of the apparatus 286 which distinguishes it from the embodiments thus far described is that it provides two impact blows upon the workpiece 36 without the application of appreciable intermediate squeeze forces. As was true of the other embodiments, the hammers 14 and 16 are driven toward each other by operation of the main valve assembly 146 to admit pressure fluid from the internal pressure reservoir 266 to the pressure chamber 284 which is defined by the pressure faces of the hammers 14 and 16, but it is noted that in the apparatus 286 this pressure fluid also freely passes through a plurality of relatively large ports 288, formed in the lower section 66, and into a squeeze chamber 290 defined between the hammer sections 64 and 66. This prevents fluid in the chamber 290 from being trapped and compressed between the hammer sections 64 and 66, and, accordingly, no squeeze forces are developed.

It is noted that part of the internal reservoir 266 is defined by structure of the base 12 as in the apparatus 256 just described, and a considerable portion of the reaction loads resulting from impact of the hammers 14 and 16 is passed to the floor. The apparatus 286 would thus be used primarily where appreciable floor loads could be tolerated, although it will be apparent that, if the floor loading is a critical factor, other embodiments of the invention, such as apparatus 10, could be employed, wherein the workpiece 36 absorbs substantially all of the kinetic energy of the hammers 14 and 16 by reason of the counterblow arrangement of the hammers and by reason of the incorporation of the internal pressure reservoir in the lower hammer 16.

Figure 27:
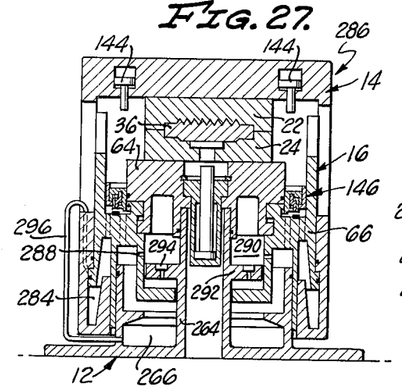
FIG. 27 is a schematic, elevational view of the apparatus of FIG. 25, illustrating the dies in engagement, the work fully formed, and the main valves still open.
Figure 28:
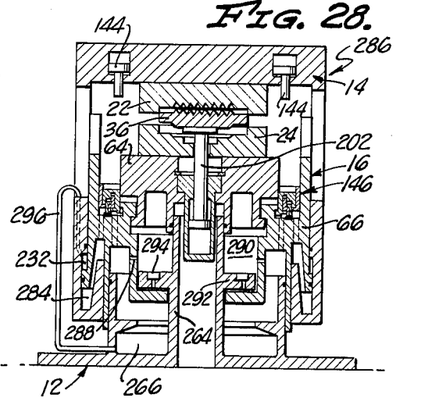
FIG. 28 is a schematic, elevational view of the apparatus of FIG. 25, subsequent to the closure of the main valves, with the dies moving away from each other, and the workpiece being knocked out.

The damping of such hammer oscillations as may occur after engagement of the hammers 14 and 16 is accomplished by utilizing the air or pressurized fluid contained in the reservoir 266. For this purpose, the inwardly located, cylindrical wall 264 of the base 12 includes a radially extending shoulder 292 within which is disposed a plurality of check valves 294. The shoulder 292 is vertically slidable adjacent a juxtaposed wall of the lower hammer section 66, as best illustrated in FIG. 27, and a predetermined clearance is provided to permit a limited flow of pressure fluid therebetween.

The check valves 294 are arranged such that fluid is adapted to flow downwardly through them without restriction, thereby permitting the hammer section 66 to move downwardly without restriction relative to the base 12. However, upward movement of the hammer section 66 relative to the base 12 is impeded by automatic closure of the check valves 294, and such upward movement of the hammer section 66 is regulated by the clearance at the shoulder 292 which controls the volume of fluid flow.

In the operation of the apparatus 286, the main valve assembly 146 is operated to raise the valves 152 and 154 thereof to permit the passage of large volumes of fluid under pressure from the internal pressure reservoir 266 to the pressure chamber 284. The hammers 14 and 16 are next driven toward each other until engagement occurs with the workpiece 36, as viewed in FIG. 26. After this initial impact, the upper hammer section 14 continues to move downwardly with the section 64 of the lower hammer 16 until engagement occurs with the hammer section 66, at which time a second impact occurs, as illustrated in FIG. 27. The common downward movement of the hammers 14 and 16 is slowed by compression of the fluid in the internal reservoir 266, but limited upward movement or oscillation of the hammer section 66 relative to the base 12 is damped by the action of the check valves 294.

Air damping of the oscillations or rebounds of the upper hammer 14 relative to the lower section 66 of the lower hammer 16 is accomplished by the damping chamber 232, and in the manner already described in conjunction with the apparatus 10. In addition, to reduce a build-up in pressure in the chamber 232, which will occur as the upper hammer 14 and the section 66 move toward each other, the damping chamber 232 is coupled to the internal reservoir 266 by a conduit 296. Thus, the pressure in the damping chamber 232 will never exceed that of the internal reservoir 266.

From the description herein made, it will be seen that the present impact apparatus, in its various forms, is adapted to provide large quantities of pressure fluid for driving impact hammers together. The internal reservoir souce for such fluid is located closely adjacent the hammers so that undesirably long connecting lines are eliminated. Annular or ring valves are employed which are operative during a relatively short stroke to pass the needed volume of fluid from the internal reservoir to the hammers to drive them together at high accelerations.

Certain of the embodiments herein described employ the "counterblow" principal, in which most of the kinetic energy of impact is absorbed by the workpiece, while other embodiments transfer considerable portions of the impact loads to the floor.

In addition, a variety of impact-squeeze relationships are producible with the present invention, the level and duration of squeeze pressures being adjustable to suit the particular application involved or to suit the particular material to be formed.

While the invention has been described by means of specific examples and specific embodiments, the invention is not limited thereto since obvious modifications and variations will occur to those skilled in the art without departing from the spirit and scope of the invention as defined by the appended claims.

I claim:

1. In impact apparatus for exerting controlled forces upon a material or workpiece, the combination of: a frame; a pair of hammers supported upon said frame for slidable movement relative to each other, said hammers including directly opposed platens, said hammers including reversely opposed coaxially arranged, mutually axially slidable pressure portions of said hammers comprising walls respectively opposite each other defining an annular pressure chamber, one of said hammers further including an internal reservoir for storage of fluid under pressure mounted on said hammer; said reservoir having a fluid capacity substantially equal to the capacity of said pressure chamber, and passage means between said reservoir and said pressure chamber having a transverse area comparable to the transverse area of said pressure chamber for introducing fluid under pressure substantially instantaneously from said reservoir into said pressure chamber to urge said platens toward each other for work upon the material or workpiece disposed therebetween.

2. In impact apparatus for exerting controlled forces upon a workpiece, the combination of: a frame; a first hammer and a second hammer axially slidably mounted upon said frame, opposed platens and cylindrical portions carried by said hammer having pressure faces which are opposed to define an annular pressure chamber, said second hammer including cylindrical first and second hammer sections in axial alignment with said second hammer and axially slidable relative to each other and having juxtaposed surfaces defining a squeeze chamber, said second hammer section including an internal reservoir for containing fluid under pressure, said reservoir being in communication with said squeeze chamber; annularly arranged valve means in communication with said reservoir at circumferentially spaced locations operative to permit said fluid to flow from said reservoir to said pressure chamber for urging said platens together to provide an impact blow upon the workpiece; and squeeze chamber valve means to regulate the flow of pressure fluid between said reservoir and said squeeze chamber to thereby control the application of supplemental squeeze forces upon said workpiece by said second hammer section following initial impact between said workpiece and said first hammer section.

3. In impact apparatus for exerting controlled forces upon a workpiece, the combination of: a frame; a first hammer and a second hammer axially slidably mounted upon said frame and including opposed platens and cylindrical portions having pressure faces which are opposed to define an annular pressure chamber, said second hammer including cylindrical first and second hammer sections axially slidable relative to each other and having juxtaposed surfaces defining a closed squeeze chamber, said second hammer section defining a reservoir with said frame internal with respect to the hammer for containing fluid under pressure; valve means carried by said second hammer operative to permit said fluid to flow from said reservoir to said pressure chamber for urging said platens together to provide an impact blow upon the workpiece; and dashpot means interposed within said reservoir between adjacent portions of said frame and said second hammer section to regulate the flow of pressure fluid therepast to thereby alleviate oscillations of said first hammer and said second hammer.

4. In impact apparatus for exerting controlled forces upon a workpiece, the combination of: a frame; a first hammer and a second hammer axially slidably mounted upon said frame and including opposed platens and cylindrical portions in axial alignment with said second hammer having pressure faces which are opposed to define an annular pressure chamber, said second hammer including cylindrical first and second hammer sections in axial alignment with said second hammer and axially slidable relative to each other and having juxtaposed surfaces defining a squeeze chamber, said second hammer section defining a reservoir with said frame internal with respect to the hammer for containing fluid under pressure, said reservoir being in communication with said squeeze chamber to permit an unrestricted flow of fluid therebetween; annularly arranged valve means operative to permit said fluid to flow from said reservoir to said pressure chamber for urging said platens together to provide an impact blow upon the workpiece; and dashpot valve means interposed within said reservoir between adjacent portions of said frame and said second hammer section to regulate the flow of pressure fluid therepast to thereby alleviate oscillations of said first hammer and said second hammer.

5. In impact apparatus for exerting controlled forces upon a workpiece, the combination of: a frame; a first hammer and a second hammer axially slidably mounted upon said frame and including directly opposed platens and cylindrical portions having pressure faces which are reversely opposed to define an annular pressure chamber, said second hammer including cylindrical first and second hammer sections axially slidable relative to each other and having juxtaposed surfaces defining a squeeze chamber, said second hammer section including an internal reservoir for containing fluid under pressure, said reservoir being in communication with said squeeze chamber; annularly arranged valve means carried by the respective hammer operative to permit said fluid flow from said reservoir to said pressure chamber for urging said platens together in a rapid movement to provide an impact blow upon the workpiece; squeeze chamber valve means to regulate the flow of pressure fluid between said reservoir and said squeeze chamber to thereby control the application of supplemental squeeze forces upon said workpiece by said second hammer section following initial impact between said workpiece and said first hammer section; and dashpot means interposed between adjacent portions of said frame and said first hammer and biased to retard the flow of fluid therepast, said bias force being small compared to the force resulting from flow of said fluid from said reservoir to said pressure chamber, whereby said dashpot means does not materially affect said rapid movement of said platens.

6. In impact apparatus for exerting controlled forces upon a workpiece, the combination of: a frame; a first hammer and a second hammer axially slidably mounted upon said frame and including opposed platens and cylindrical portions having pressure faces which are opposed to define an annular pressure chamber, said second hammer including cylindrical first and second hammer sections axially slidable relative to each other and having juxtaposed surfaces defining a squeeze chamber, said second hammer section including an internal reservoir for containing fluid under pressure, said reservoir being in communication with said squeeze chamber; annularly arranged valve means including a pair of ring valves movable to open positions to permit said fluid to flow from said reservoir to said pressure chamber for urging said platens together to provide an impact blow upon the workpiece, said ring valves being separably immovable to permit said flow; and squeeze chamber valve means to regulate the flow of pressure fluid between said reservoir and said squeeze chamber to thereby control the character of application of supplemental squeeze forces upon said workpiece by said second hammer section following initial impact between said workpiece and said first hammer section.

7. In impact apparatus for exerting controlled forces upon an object, the combination of: a frame; a plurality of hammers supported upon said frame for slidable movement relative to each other, at least a pair of said hammers including opposed platens and coaxially arranged, mutually axially slidable portions of said pair of hammers defining an annular pressure chamber, one of said hammers further including a chamber internal with respect to said last hammer and a floating piston dividing said chamber into a reservoir for liquid and an accumulator compartment for compressed gas; means for continually supplying liquid under pressure to said reservoir; means for pressurizing said accumulator compartment to a predetermined level; and means for introducing liquid under pressure from said reservoir into said pressure chamber to urge said platens toward each other for work upon the object disposed therebetween.

8. In a high velocity impact apparatus for exerting controlled forces upon a workpiece, the combination of: a frame; a hammer supported upon said frame for axial slidable movement, said hammer including hammer sections movable relative to each other and having juxtaposed surfaces defining a squeeze chamber of selected initial volume having fluid therein at an initial fluid operating pressure; power means in operable association with said hammer for urging said hammer relatively toward said workpiece and moving said hammer sections toward each other thereby to reduce the volume of said squeeze chamber; one of said hammer sections including a workpiece engaging area, said power means having an initial pressure productive of a first substantial deforming force on said workpiece upon engagement of the workpiece by said one hammer section and productive of a substantial increase in fluid operating pressure in the fluid initially present in the squeeze chamber in response to said reduction in volume, the increased fluid operating pressure in the squeeze chamber being productive of a secondary substantial deforming force on said workpiece.

9. In a high velocity impact apparatus for exerting initial impact and secondary controlled forces upon an object, the combination of: a frame; hammers supported upon said frame for axial slidable movement relative to said object; power means in operable association with said hammers productive of an initial impact force by said hammers upon said object, one of said hammers including hammer sections movable relative to each other and having juxtaposed relatively moving surfaces defining a squeeze chamber of selected initial volume; a source of fluid connected to said squeeze chamber at a pressure adapted to introduce an initial available operative force in said squeeze chamber, the volume in said squeeze chamber being smaller after said hammer sections have been subjected to said initial force and the fluid in said squeeze chamber at said smaller volume being productive of a secondary available operative force between said hammer sections increasing in magnitude from the initial available operative force for urging said hammers relatively toward said object; a passage in communication with said squeeze chamber and fluid control means for said passage adapted to control the flow of fluid in said passage upon engagement between said object and one of said hammer sections to thereby enable the other of said hammer sections to continue movement subject to a selected force against said one of said hammer sections immediately subsequent to said initial impact of said hammers against said object.

10. In impact apparatus for exerting controlled forces upon a material, the combination of: a frame; a pair of hammers supported upon said frame for axial slidable movement into and out of juxtaposition to each other, said hammers including directly opposed platens, a space behind one of said hammers and in axial alignment therewith comprising a reservoir for fluid under pressure, and reversely opposed, telescoping and annularly arranged pressure faces located radially outwardly of said space and constituting walls of a pressure chamber; a fluid pressure supply line between said reservoir and said pressure chamber, said line having a control valve therein for introducing fluid under pressure from said space into said pressure chamber to urge said pressure faces apart and said platens toward each other for work upon the material disposed therebetween, and a fluid pressure exhaust means from said pressure chamber.

11. In impact apparatus for exerting controlled forces upon an object, the combination of: a frame; a plurality of hammers axially slidably mounted upon said frame, at least a pair of said hammers including opposed platens and cylindrical portions having pressure faces arranged in opposed relation to define an annular pressure chamber, a source of fluid pressure, one of said pair of hammers including cylindrical first and second hammer sections axially slidable relative to each other and having juxtaposed surfaces defining a squeeze chamber of selected initial volume in communication with said source of fluid pressure, said squeeze chamber having fluid therein at an initial fluid operating pressure, said second hammer section including an internal reservoir located inwardly relative to said pressure chamber and in communication with said source for containing fluid under pressure; a passage from said reservoir to said pressure chamber and valve means in said passage annularly arranged adjacent said annular pressure chamber and operative to permit said fluid to flow from said reservoir to said pressure chamber, said pressure in said pressure chamber providing an initial force urging said platens together in an initial impact blow upon said object, said hammer sections being moved together in response to said initial force to secondary operative positions wherein said squeeze chamber has a smaller volume and greatly increased operating pressure productive of a secondary substantial deforming force on said object, said valve means including a valve movable to adjust the rate of flow of said fluid upon operation of said valve means.

12. In a high velocity impact apparatus for exerting a succession of controlled forces upon a material, the combination of a frame, a plurality of hammers supported upon said frame for sliding movement relative to each other, said hammers including opposed platens, a source of fluid pressure, means forming a pressure chamber between said hammers and connected thereto, one of said hammers being a multiple part hammer comprising sections mutually movable in line with said sliding movement and forming a squeeze chamber therebetween, a passage of limited capacity between said squeeze chamber and said source of fluid pressure, a fluid pressure reservoir in communication with said source of fluid pressure, said passage between said squeeze chamber and said source of fluid pressure being constantly open during relative movement of said hammers toward impact, said pressure chamber when open to said fluid pressure being productive of an available force, said squeeze chamber having an initial volume subject to an initial pressure, said squeeze chamber being of smaller volume when said hammer sections are undergoing initial contact with the material, an operating passageway between said reservoir and said pressure chamber, a control valve means in said operating passageway adapted to initiate operation of said hammers, an exhaust passage means from said pressure chamber, and an exhaust port from said squeeze chamber, said exhaust port having a restricted capacity, whereby a controlled force subsequently exerted by said squeeze chamber is greater than the available force exerted by said pressure chamber.

13. In a high velocity impact apparatus for exerting a succession of controlled forces upon a material, the combination of a frame, a plurality of hammers supported upon said frame for sliding movement relative to each other, said hammers including opposed platens, a source of fluid pressure, means forming a pressure chamber between said hammers and connected thereto having mutually movable walls and opposed areas responsive to fluid pressure, one wall forming part of one of said hammers and the other wall forming part of the other of said hammers, one of said hammers being a multiple part hammer comprising sections mutually movable in line with said sliding movement and forming a squeeze chamber therebetween, a fluid pressure reservoir, inlet passage means of limited capacity to said squeeze chamber adapted to be constantly open during relative movement of said hammers toward impact, said inlet passage means and said reservoir being in communication with said source of fluid pressure, whereby said squeeze chamber and said reservoir are both initially subject to an operating pressure, an exhaust port from said squeeze chamber, said exhaust port having a restricted capacity, an operating passageway between said reservoir and said pressure chamber, an exhaust passage means from said pressure chamber, a control valve in said passageway adapted to initiate movement of said hammers toward each other, whereby the force created by pressure in the squeeze chamber is built up to an amount in excess of the force created by pressure in said pressure chamber.

14. In a high velocity impact apparatus for exerting a succession of controlled forces upon a material, the combination of a frame, a plurality of hammers supported upon said frame for sliding movement relative to each other, and a source of fluid pressure, said hammers including opposed platens, means forming a pressure chamber between said hammers and connected thereto and having opposed areas responsive to fluid pressure, one of said hammers being a multiple part hammer comprising two sections mutually movable relative to each other in line with said sliding movement and forming a squeeze chamber therebetween of selected initial volume, a fluid pressure reservoir in communication with said source of fluid pressure and forming part of one of said hammers, inlet passage means of relatively limited capacity intermediate respectively said reservoir and said squeeze chamber and adapted to be constantly open during relative movement of said hammers toward impact, an exhaust port from said squeeze chamber, said exhaust port having a restricted capacity, an operating passageway between said reservoir and said pressure chamber, an exhaust passage from said pressure chamber, and a control valve in said operating passageway adapted to initiate movement of said hammers toward each other, said hammers when moved toward each other effecting a reduction in volume of said squeeze chamber in response to movement of said two sections toward each other, whereby force exerted by pressure in said squeeze chamber is built up to an amount in excess of the force exerted by pressure in said pressure chamber.

15. In a high velocity impact apparatus for exerting a succession of controlled forces upon a material, the combination of a frame, a plurality of hammers supported upon said frame, and a source of working fluid pressure, said hammers having relative sliding movement therebetween, at least one of said hammers being a multiple part hammer comprising sections including opposed areas responsive to fluid pressure mutually movable in line with said sliding movement and forming a squeeze chamber therebetween, and passage means in communication with said source of working fluid pressure and said squeeze chamber for control of fluid in said squeeze chamber, means forming a pressure chamber between said hammers including opposed pressure responsive areas subject to fluid pressure and productive of an initial force moving said hammers through a work stroke, at least one wall of said pressure chamber forming part of one of said hammers, a fluid pressure reservoir forming part of one hammer having a capacity at least equal to the capacity of said pressure chamber, said last identified hammer having an operating passageway therein between said reservoir and said pressure chamber of relatively large capacity adapted to pass fluid under pressure in said reservoir to said pressure chamber substantially instantaneously, a variable controllable valve in operable association with said passageway adapted to initiate operation of said hammers, and exhaust passage means from said pressure chamber.

16. In a high velocity impact apparatus for exerting a succession of controlled forces upon a material, the combination of a frame, a plurality of hammers supported upon said frame, and a source of fluid working pressure, said hammers having relative sliding movement therebetween, at least one of said hammers being a multiple part hammer comprising sections mutually movable in line with said sliding movement and forming a squeeze chamber therebetween, and passage means in communication with said source of fluid pressure and said squeeze chamber for control of fluid in said squeeze chamber, said squeeze chamber having opposed areas responsive to fluid pressure, means forming a pressure chamber between said hammers, at least one wall of said pressure chamber forming part of said multiple part hammer, said pressure chamber having opposed pressure responsive areas subject to fluid pressure and productive of an initial force moving said hammers to a work deforming position, a fluid pressure reservoir forming part of one hammer having a capacity at least as large as the capacity of said pressure chamber, and a variable controllable valve in said passageway adapted to initiate operation of said hammers, said pressure reservoir having an energy capacity at least equal to the energy consumption of hammers during a full working cycle, and exhaust means from said pressure chamber operable subsequent to completion of a working cycle.

References Cited by the Examiner
UNITED STATES PATENTS

| | | | |
|---|---|---|---|
| 2,117,575 | 5/1938 | Saives | 78—20 |
| 2,122,899 | 7/1938 | Towler | 78—20 |
| 2,482,280 | 9/1949 | Lerma | 78—42 |
| 2,932,951 | 4/1960 | Ottestad et al. | 60—97 |
| 2,994,302 | 8/1961 | Murek | 121—38 |
| 3,108,503 | 10/1963 | Murek | 78—42 |

CHARLES W. LANHAM, *Primary Examiner.*

RICHARD H. EANES, *Examiner.*